United States Patent
Schmidt et al.

(10) Patent No.: US 7,725,680 B1
(45) Date of Patent: May 25, 2010

(54) PIPELINE INTERPOSER

(75) Inventors: William R. Schmidt, Boise, ID (US); Douglas G. Keithley, Boise, ID (US)

(73) Assignee: Marvell International Ltd., Hamilton (BM)

( * ) Notice: Subject to any disclaimer, the term of this patent is extended or adjusted under 35 U.S.C. 154(b) by 375 days.

(21) Appl. No.: 11/825,203

(22) Filed: Jul. 5, 2007

Related U.S. Application Data

(60) Provisional application No. 60/818,818, filed on Jul. 6, 2006.

(51) Int. Cl.
*G06F 13/00* (2006.01)
(52) U.S. Cl. .......................................... 712/10; 712/35
(58) Field of Classification Search ........................ None
See application file for complete search history.

(56) References Cited

U.S. PATENT DOCUMENTS

| | | | | |
|---|---|---|---|---|
| 5,265,218 A | * | 11/1993 | Testa et al. .................. | 710/100 |
| 5,410,654 A | * | 4/1995 | Foster et al. ................. | 711/147 |
| 6,717,834 B2 | * | 4/2004 | Zagorianakos et al. ........ | 365/63 |
| 6,732,250 B2 | * | 5/2004 | Durrant ....................... | 711/202 |
| 7,475,175 B2 | * | 1/2009 | Klein et al. .................. | 710/100 |

* cited by examiner

*Primary Examiner*—Eric Coleman

(57) ABSTRACT

An application specific integrated circuit (ASIC) comprises a first bus that communicates with inputs and outputs of N processing modules, where N is an integer greater than 1. A control module communicates with the first bus and a second bus that is different than the first bus, and that generates first control signals. A routing module communicates with the first bus, receives data via the second bus from a first memory, selectively routes the data to a first of the inputs, and selectively routes one of the outputs to a second of the inputs. The routing module selects the first and second of the inputs based on the first control signals.

40 Claims, 13 Drawing Sheets

PIPELINE INTERPOSER

CROSS-REFERENCE TO RELATED APPLICATIONS

This application claims the benefit of U.S. Provisional Application No. 60/818,818, filed Jul. 6, 2006. The disclosure of the above application is incorporated herein by reference in its entirety.

FIELD

The present disclosure relates to integrated circuit (IC) architectures, and more particularly to pipeline architectures in application specific integrated circuits (ASICs).

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Data processing systems that process complex data may perform several operations on the data. For example, systems that process video data and image data (collectively image data) (e.g., digitized photographs) may perform decoding, color space conversion (CSC), filtering, and scaling of the image data. Application specific integrated circuits (ASICs) that are customized to perform the operations may be used to efficiently process the data.

Referring generally to FIGS. 1-3, different data processing system architectures are shown. In FIG. 1, a typical data processing system is shown. In FIG. 2, a data processing system utilizing a pipeline architecture is shown. In FIG. 3, an ASIC that utilizes the pipeline architecture to process image data is shown.

Referring now to FIG. 1, a data processing system (DPS) 10 is shown. The DPS 10 may process different types of data. For example, the DPS 10 may process image data comprising digital graphic images. The image data may conform to the Joint Photographic Experts Group (JPEG) standard. The DPS 10 may be used in handheld devices such as digital cameras and video recorders.

The DPS 10 may comprise a processor 12, a memory control module 13, a system memory 14, an I/O module 15, a data processing module (DPM) 16, and a system bus 18. The processor 12 may execute application programs including graphics-based applications. The memory control module 13 may control the system memory 14 and perform memory management functions. The I/O module 15 may receive image data from a source such as a camera (not shown). The image data may be stored in the system memory 14. The DPM 16 may communicate with the system memory 14 via the system bus 18 and process the image data. The DPM 16 may utilize direct memory access (DMA) to access the system memory 14.

Typically, the DPM 16 may comprise a plurality of processing modules 20-1, 20-2, ..., 20-N (collectively processing modules 20), where N is an integer greater than or equal to 1. For example, the processing modules 20-1, 20-2, 20-3, and 20-4 may include a decoder module, a CSC module, a filter module, and a scaling module, respectively (all not shown). A first processing module 20-1 comprising the decoder module may receive the image data from the system memory 14. The first processing module 20-1 may decode (i.e., uncompress) the image data and transfer the uncompressed data to the system memory 14. The second processing module 20-2 comprising the CSC module may receive the uncompressed data from the system memory 14. The second processing module 20-2 may perform CSC and transfer the color converted data to the system memory 14.

The processing by remaining processing modules 20 may continue until an $N^{th}$ processing module 20-N generates and stores a final product of the image data in the system memory 14. For example, the final product be generated by the fourth processing module 20-4 comprising the scaling module and may contain uncompressed, color converted, filtered and scaled image data.

Thus, data may communicate via the system bus 18 2*N times between the system memory 14 and the DPM 16 when the DPM 16 comprises N processing modules 20. Transferring data 2*N times across the system bus 18 may adversely impact the bandwidth of the system bus 18. The impact may be reduced by using the pipeline architecture wherein individual first-in first-out (FIFO) buffers may be provided for each processing module 20. Instead of storing the data processed by each processing module 20 in the system memory 14, the FIFO buffer associated with each processing module 20 can store the data. Additionally, instead of receiving the data processed by a prior processing module 20 from the system memory 14, a subsequent processing module 20 may receive the data from the FIFO buffer of the preceding processing module 20.

Referring now to FIG. 2, a DPS 30 utilizing the pipeline architecture is shown. The DPS 30 may comprise the processor 12, the memory control module 13, the system memory 14, the I/O module 15, and a pipelined DPM 32. The pipelined DPM 32 may comprise a plurality of processing modules 36-1, 36-2, ..., 36-N (collectively processing modules 36), where N is an integer greater than or equal to 1. The processing modules 36-1, 36-2, ..., 36-N may include a decoder module, a color space converter module, a filter module, and a scaling module, respectively, where N=4. Each of the processing modules 36 is preceded by a FIFO buffer 34-1, 34-2, ..., 34-N (collectively FIFO buffers 34), respectively. The FIFO buffer 34-1 is optional. The processing module 36-1 may receive data from the bus and the processing module 36-N may send data to the bus. A FIFO buffer may also be arranged at the output of the processing module 36-N. In other words, FIFO buffers may be arranged between the bus and the first/last modules are optional.

The processing modules 36 and the FIFO buffers 34 may be connected in series as shown and may have standard pipeline communication interfaces. Consequently, data needs to flow through the processing modules 36 and the FIFO buffers 34 (i.e., through the pipeline) in the sequence in which the processing modules 36 and the FIFO buffers 34 are connected.

Typically, the first FIFO module 34-1 may receive the image data from the system memory 14 and output the image data to a first processing module 36-1. The first processing module 36-1 comprising the decoder module may uncompress the image data and transfer the processed data to the second FIFO buffer 34-2. The second FIFO buffer 34-2 may output the uncompressed data to the second processing module 36-2. The second processing module 36-2 comprising the CSC module may perform CSC and output the color converted data to the subsequent FIFO buffer (not shown).

The processing by the remaining processing modules may continue in the sequence until an $N^{th}$ processing module 36-N generates the final product of the image data. The final product is stored in the system memory 14. The final product may contain uncompressed, color converted, filtered and scaled image data.

Referring now to FIG. 3, an ASIC 50 that utilizes the pipeline architecture to process image data is shown. The ASIC 50 may comprise the processor 12, the memory control module 13, the I/O module 15, a DPM 51, and the system bus 18. The DPM 51 may comprise a decoder module 52, a CSC module 54, a filter module 56, and a scaling module 58 that communicate with the system bus. The ASIC 50 may communicate with the system memory 14 via the memory control module 13. The ASIC 50 may process the image data as follows.

The I/O module 15 may receive a compressed JPEG file. The file may comprise image data containing an 8.5"×11" color image at 600 dpi. With 24 bit color and 10:1 compression ration, the file size may be 10.1 MB. The file may be stored in the system memory 14. The ASIC 50 may process the file to enlarge, shrink, or rotate the image, or alter colors of the image.

Specifically, the memory control module 13 may read the file from the system memory 14 by performing a DMA operation and forward the data in the file to the decoder module 52. The decoder module 52 may decode the data and generate uncompressed data. The uncompressed data may be very large (e.g., 101 MB). Accordingly, the memory control module 13 may write the 101 MB of uncompressed data back to the system memory 14 by performing a DMA operation. The DMA operation may be complex since the output of JPEG is an 8×8 array of pixels, and the JPEG data is not in raster order unless the DMA operation buffers and writes the array to several memory locations.

Subsequently, the memory control module 13 may perform another DMA operation, read the 101 MB of uncompressed data from the system memory 14, and forward the uncompressed data to the CSC module 54. After performing CSC, the CSC module 54 may forward the color converted data to the filter module 56. The filter module 56 may prepare multiple lines of the color converted data before applying a filter algorithm to the color converted data. A local SRAM buffer 57 associated with the filter module 56 may store the multiple lines during filtering.

After filtering, the filter module 56 may forward the filtered data to the scaling module 58. The scaling module 58 may scale the filtered data up or down depending on whether the image is to be enlarged or reduced. To perform scaling, at least one full line of the filtered data may have to be buffered. A local SRAM buffer 59 associated with the scaling module 58 may store the line during scaling.

After scaling, the memory control module 13 may write the scaled data back to the system memory 14 by performing another DMA operation. The DMA operation may be complex if the image is flipped or rotated, wherein the memory control module 13 receives data from the scaling module 58 and writes it in reverse line order in the system memory 14.

Thus, while the ASIC 50 processes the image data, the memory control module 13 may write large amounts of data twice to the system memory 14 and read the uncompressed data once from the system memory 14. Consequently, the adverse impact on the bandwidth of the system bus 18 may be somewhat reduced when the pipeline architecture is used.

Also, the processing modules that process data and perform different functions on the data are connected to one another in a fixed order.

SUMMARY

An application specific integrated circuit (ASIC) comprises a first bus that communicates with inputs and outputs of N processing modules, where N is an integer greater than 1. A control module communicates with the first bus and a second bus that is different than the first bus, and that generates first control signals. A routing module communicates with the first bus, receives data via the second bus from a first memory, selectively routes the data to a first of the inputs, and selectively routes one of the outputs to a second of the inputs. The routing module selects the first and second of the inputs based on the first control signals.

In other features, a system comprises the ASIC and the first memory. A second memory that is different than the first memory communicates with the first bus. The control module generates second control signals that are different than the first control signals. The routing module selectively routes the data and the one of the outputs to portions of the second memory based on the first control signals. A memory size of the portions is determined based on the second control signals. A memory management module communicates with the first bus and determines the memory size of the portions based on the second control signals.

In other features, the routing module routes information stored in the portions to one of the inputs selected based on the first control signals. The routing module routes the one of the outputs to the first memory based on the first control signals. The second memory includes an embedded dynamic random access memory (eDRAM). The control module generates the first control signals based on information received from a processor in the ASIC. The control module generates the second control signals based on processing speeds of the processing modules. The processing modules comprise a standard pipeline interface. The processing modules communicate with each other in an order determined by the first control signals. The order is sequential.

In other features, an input/output (I/O) module communicates with the second bus, receives the data from sources external to the ASIC, and stores the data in the first memory. A processor executes programs that use processed data generated by the processing modules.

In other features, an image data processing device comprising the ASIC of claim 1 wherein the processing modules include a decoder module, a color space converter (CSC) module, a filter module, and a scaling module, wherein the processing modules process the data in an order that is determined by the first control signals. The first memory is integrated with or external to the ASIC.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
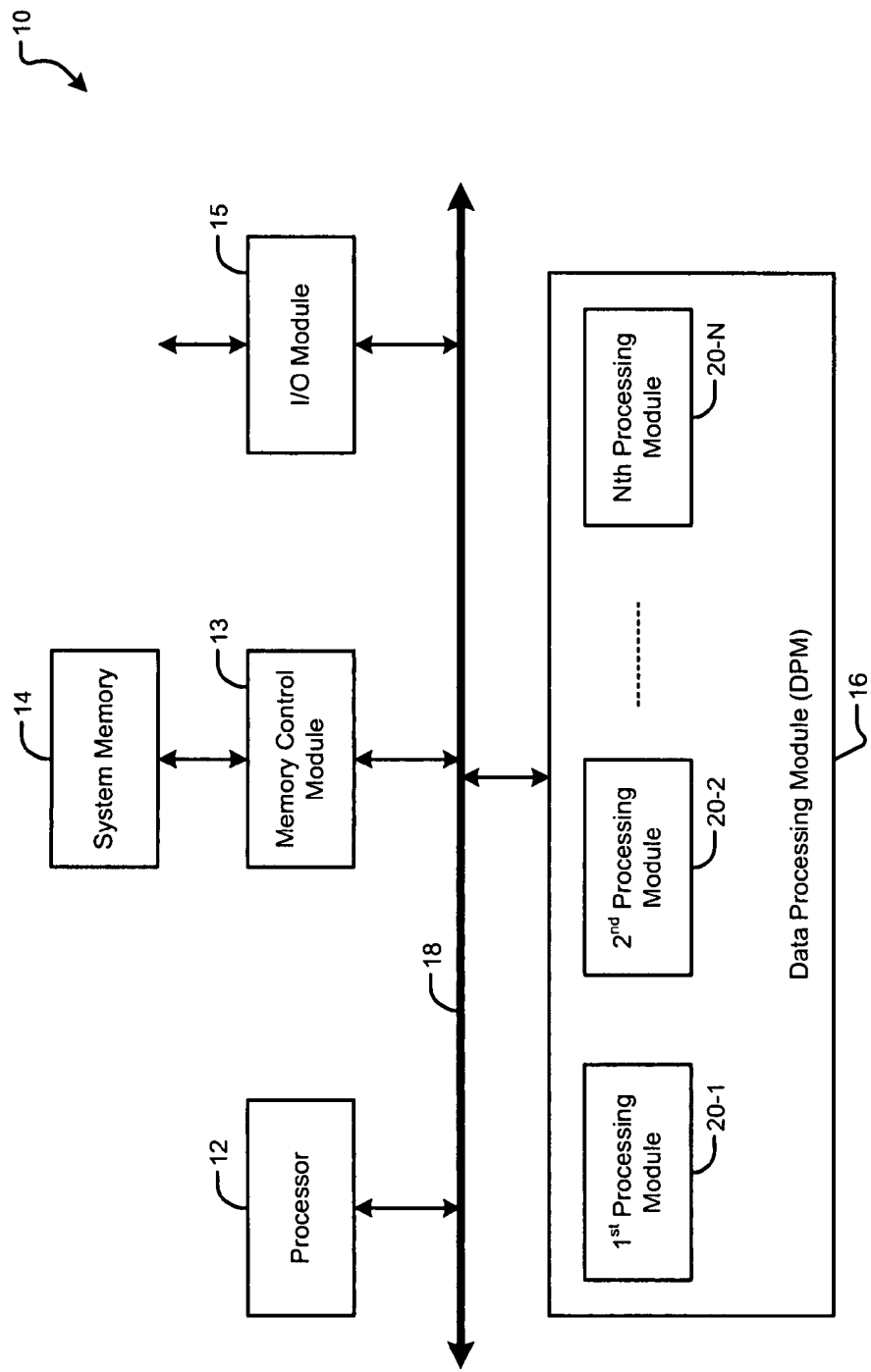
FIG. 1 is a functional block diagram of a typical data processing system according to the prior art.
Figure 2:
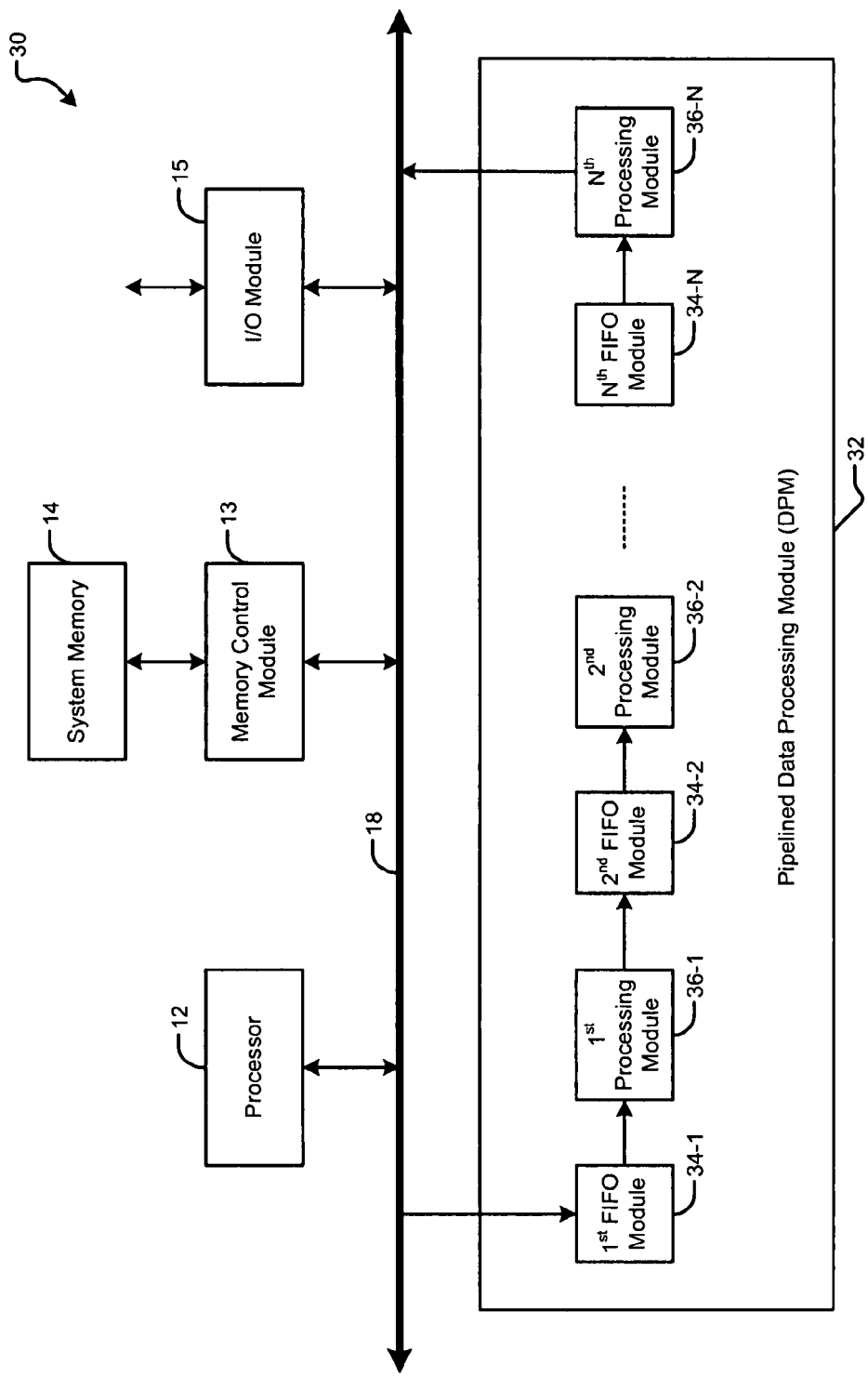
FIG. 2 is a functional block diagram of a data processing system utilizing a pipeline architecture according to the prior art.
Figure 3:
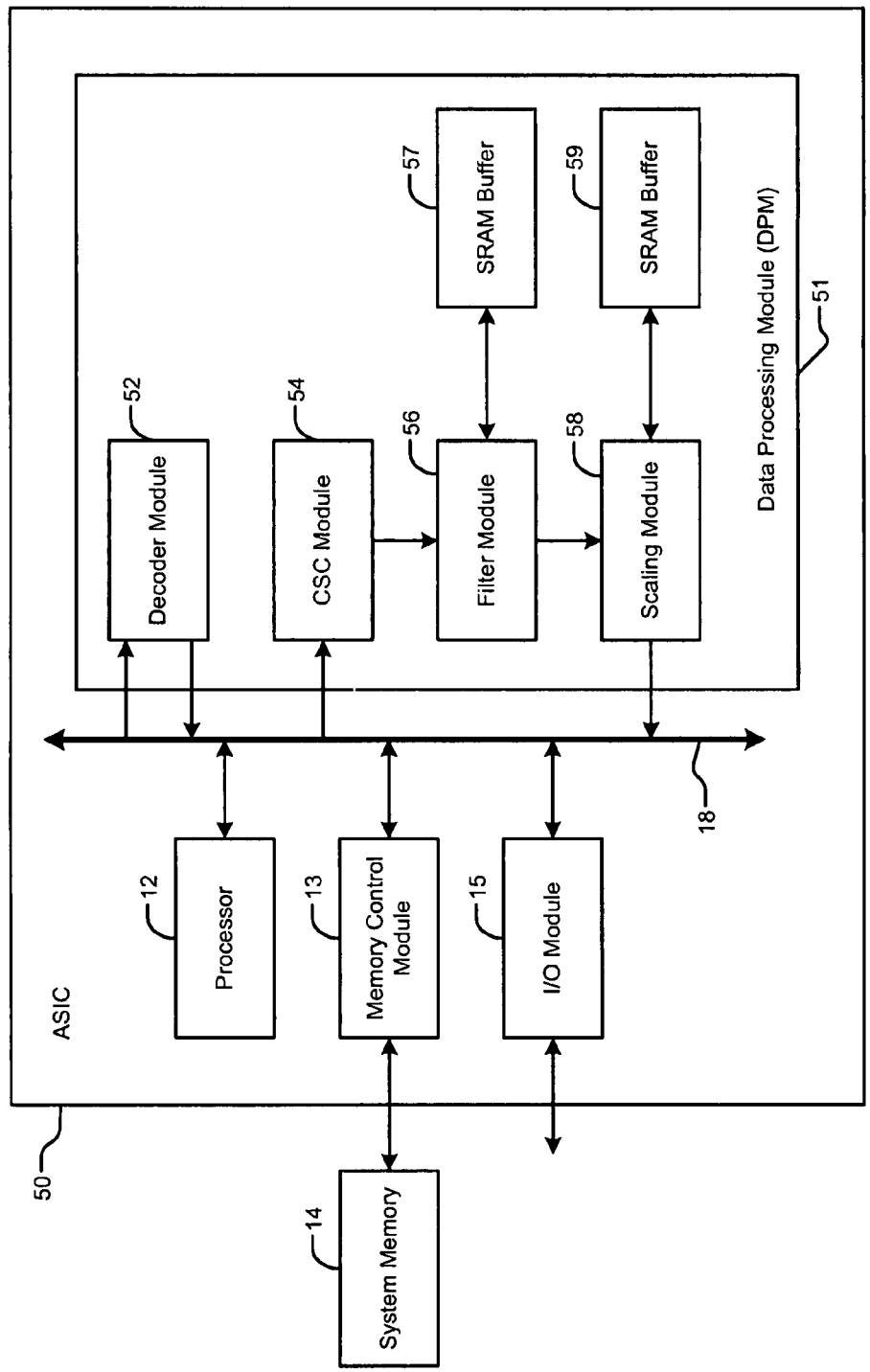
FIG. 3 is a functional block diagram of an ASIC that utilizes a pipeline architecture according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Pipeline architectures currently implemented by application specific integrated circuits (ASICs) have several drawbacks. First, the processing modules that process data and perform different functions on the data are connected to one another in a fixed order. Consequently, data flows through the processing modules in the fixed order although one of the functions is not selected. For example, data flows through decoder, filter, and scaling modules in that order although filtering and/or scaling may not be desired. Additionally, data cannot be processed in a different order. For example, data cannot be scaled before being filtered.

Second, the size of buffers used with each processing module is fixed based on data flow analyses performed during ASIC design. For example, some processing modules may process data at a different rate than the rate at which data is received from a preceding processing module. Accordingly, to ensure that data flows through the pipeline in a consistent manner, adequate buffering has to be provided for each processing module. Once ASICs are fabricated, however, the buffer size cannot be altered if actual data flows vary or if the buffer size is inadequate.

Third, having large individual buffers for each processing module may consume large area and power in ASICs. Finally, multiple transfers of large amounts of data between processing modules and system memory across the system bus adversely impact the bandwidth of the system bus.

The present disclosure relates to a pipeline interposer that can be used in ASICs between the system bus and the processing modules to alleviate one or more of above-mentioned problems. For example, the pipeline interposer may allow configurable connections between the processing modules and provide a single configurable buffer that can be shared by the processing modules. By eliminating individual buffers for each processing module, the pipeline interposer may reduce the size and power consumption of ASICs. Also, the pipeline interposer may exchange data between processing modules and the system memory only twice, which may significantly lessen the load on the bandwidth of the system bus.

While the DMA module is shown associated with the memory module, the DMA module may be associated with the control module or the memory module.

Figure 4A:
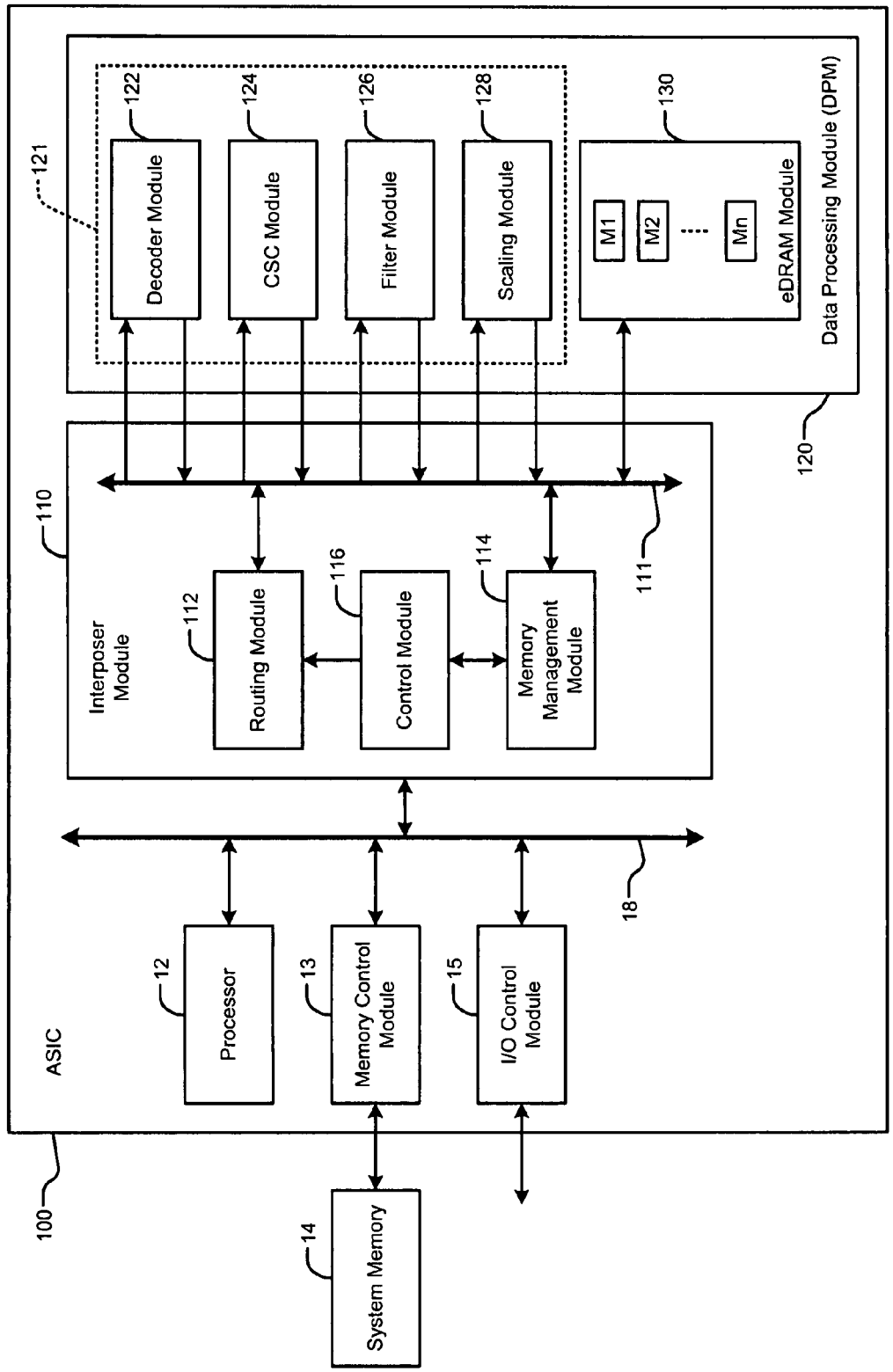
FIG. 4A is a functional block diagram of an ASIC that utilizes a pipeline interposer according to the present disclosure.

Referring now to FIG. 4A, an ASIC 100 comprising a pipeline interposer according to the present disclosure is shown. The ASIC 100 may comprise the processor 12, the memory control module 13, the I/O module 15, and an interposer module 110 that communicate via the system bus 18. The ASIC 100 may communicate with the system memory 14 via the memory control module 13.

Additionally, the ASIC 100 may comprise a data processing module (DPM) 120 that communicates with the interposer module 110 via an interposer bus 111. The DPM 120 may comprise a plurality of processing modules (collectively shown as 121) and an embedded dynamic random access memory (eDRAM) module 130. The eDRAM module 130 may be tightly coupled to the processing modules 121. The processing modules 121 and the eDRAM module 130 may be arranged in a flexible pipeline architecture that can be dynamically configured by the interposer module 110. Additionally, the interposer module 110 may dynamically allocate different amount of memory in the eDRAM module 130 that the processing modules 121 may use as buffer.

As an example, the DPM 120 is shown to include the processing modules 121 that perform some functions for processing image data. Alternatively, skilled artisans can appreciate that the DPM 120 can comprise additional processing modules or other processing modules that can perform some other functions and that can process different types of data. For example, the DPM 120 may include processing modules that process audio data generated by speech-recognition systems.

The processing modules 121 may comprise a decoder module 122, a color space conversion (CSC) module 124, a filter module 126, and a scaling module 128. The decoder module 122 may decode a file containing image data conforming to the Joint Photographic Experts Group (JPEG) standard. The CSC module 124 may perform CSC function on the image data. The filter module 126 may filter the image data. The scaling module may scale the image data.

The interposer module 110 may comprise a routing module 112, a memory management module 114, and a control module 116. The control module 116 may dynamically configure the order or the sequence of the pipeline in which the processing modules 121 may process data. The control module 116 may generate control signals based on processing instructions or commands received from the processor 12. Based on the control signals, the routing module 112 may route data between the system memory 14 and any of the processing modules 121 or the eDRAM module 130 in the DPM 120. Additionally, the routing module 112 may route data within the DPM 120.

Additionally, the control module 116 may generate memory allocation signals depending on the processing speeds of the processing modules 121. Based on the memory allocation signals, the memory management module 114 may dynamically allocate adequate amount of memory in the eDRAM module 130 that can be used as buffer by any of the processing modules 121. For example, the memory management module 114 may dynamically allocate one or more blocks M1, M2, . . . , Mn of memory as buffer to any of the processing modules 121.

Specifically, the inputs and outputs (which may be called input and output channels) of the routing module 112, the processing modules 121, and the eDRAM module 130 may communicate with the interposer bus 111 instead of communicating directly with one another. The input and output channels may communicate with the interposer bus 111 using standard pipeline interfaces. Based on the control signals, the routing module 112 may connect inputs of one of the modules connected to the interposer bus 111 to outputs of another module connected to the interposer bus 111.

Thus, the routing module 112 may route data between any two processing modules 121 or between any of the processing modules 121 and the eDRAM module 130. Alternatively, due to use of standard pipeline interfaces, the interposer module 110 may configure the processing modules 121 in a conventional pipeline architecture where a preceding processing module 121 communicates with a subsequent processing module 121.

As an example, the ASIC 100 may process the image data as follows. The processor 12 may execute application programs including graphics-based applications. The I/O module 15 may receive image data in the form of a compressed JPEG file from a source such as a camera (not shown). The file may comprise data containing an 8.5"×11" color image at 600 dpi. With 24 bit color and 10:1 compression ration, the file size may be 10.1 MB. The file may be stored in the system memory 14. The ASIC 100 may process the file to enlarge, shrink, or rotate the image, or alter colors of the image.

Specifically, the memory control module 13 may read the file from the system memory 14 by performing a DMA operation and forward the image data in the file to the interposer module 110. Based on the control signals generated by the control module 116, the routing module 112 may route the image data to the eDRAM module 130 for buffering or directly to the decoder module 122 for decoding. If the data from the system memory is buffered in the eDRAM module 130, the routing module 112 may route the image data from the eDRAM module 130 to the decoder module 122. The decoder module 122 may decode the image data and generate 101 MB of uncompressed data.

Based on the control signals, the routing module 112 may route the uncompressed data from the decoder module 122 to the eDRAM module 130 for buffering or directly to the CSC module 124, the filter module 126, or the scaling module 128. Alternatively, the routing module 112 may route the uncompressed data to the system memory 14. When the uncompressed data is buffered in the eDRAM module 130, the routing module 112 may route the uncompressed data from the eDRAM module 130 to the CSC module 124, the filter module 126, or the scaling module 128.

When the CSC module 124 receives the uncompressed data, the CSC module 124 may generate color converted data based on the uncompressed data. When the filter module 126 receives the uncompressed data, the filter module 126 may generate filtered data based on the uncompressed data. When the scaling module 128 receives the uncompressed data, the scaling module 128 may generate scaled data based on the uncompressed data.

Subsequently, based on the control signals, the routing module 112 may route the color converted data to the eDRAM module 130, the filter module 126, or the scaling module 128. Alternatively, the routing module 112 may route the filtered data to the eDRAM module 130, the CSC module 124, or the scaling module 128. Or the routing module 112 may route the scaled data to the eDRAM module 130, the CSC module 124, or the filter module 126.

During processing, when the routing module 112 routes data to the eDRAM module 130, the memory management module 114 may dynamically allocate adequate amount of memory in the eDRAM module 130 for buffering. After processing is complete, the routing module 112 may route the color converted, filtered, and/or scaled data back to the system memory 14.

Figure 4B:
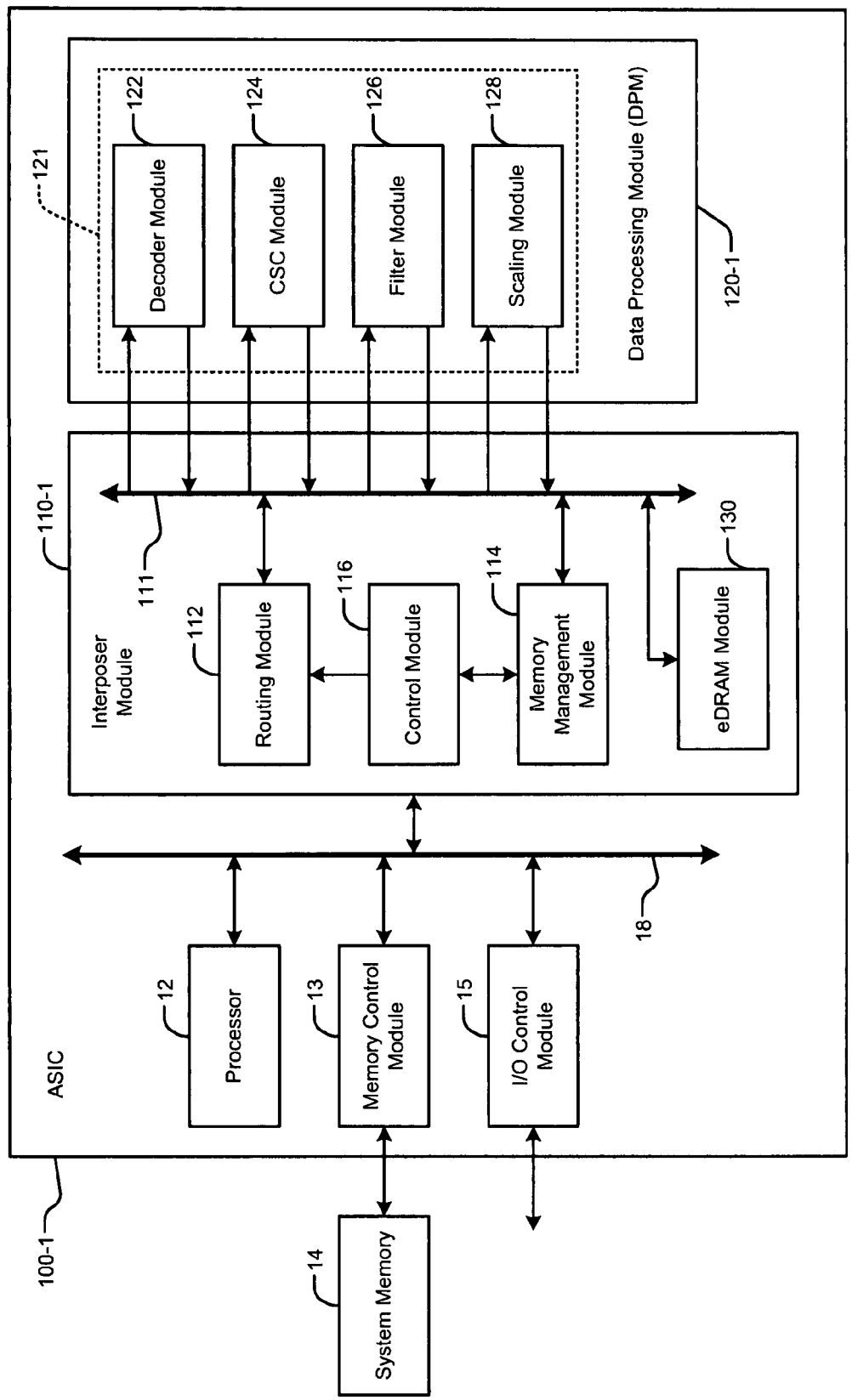
FIG. 4B is a functional block diagram of an ASIC that utilizes a pipeline interposer according to the present disclosure.

Referring now to FIG. 4B, an ASIC 100-1 is shown wherein the eDRAM module 130 may be implemented by an interposer module 110-1 instead of by a DPM 120-1. In some implementations, the DMA operation may be performed by the control module 116 instead of by the memory control module 13. When suitable, SRAM or other type of memory may be used instead of eDRAM.

Figure 5A:
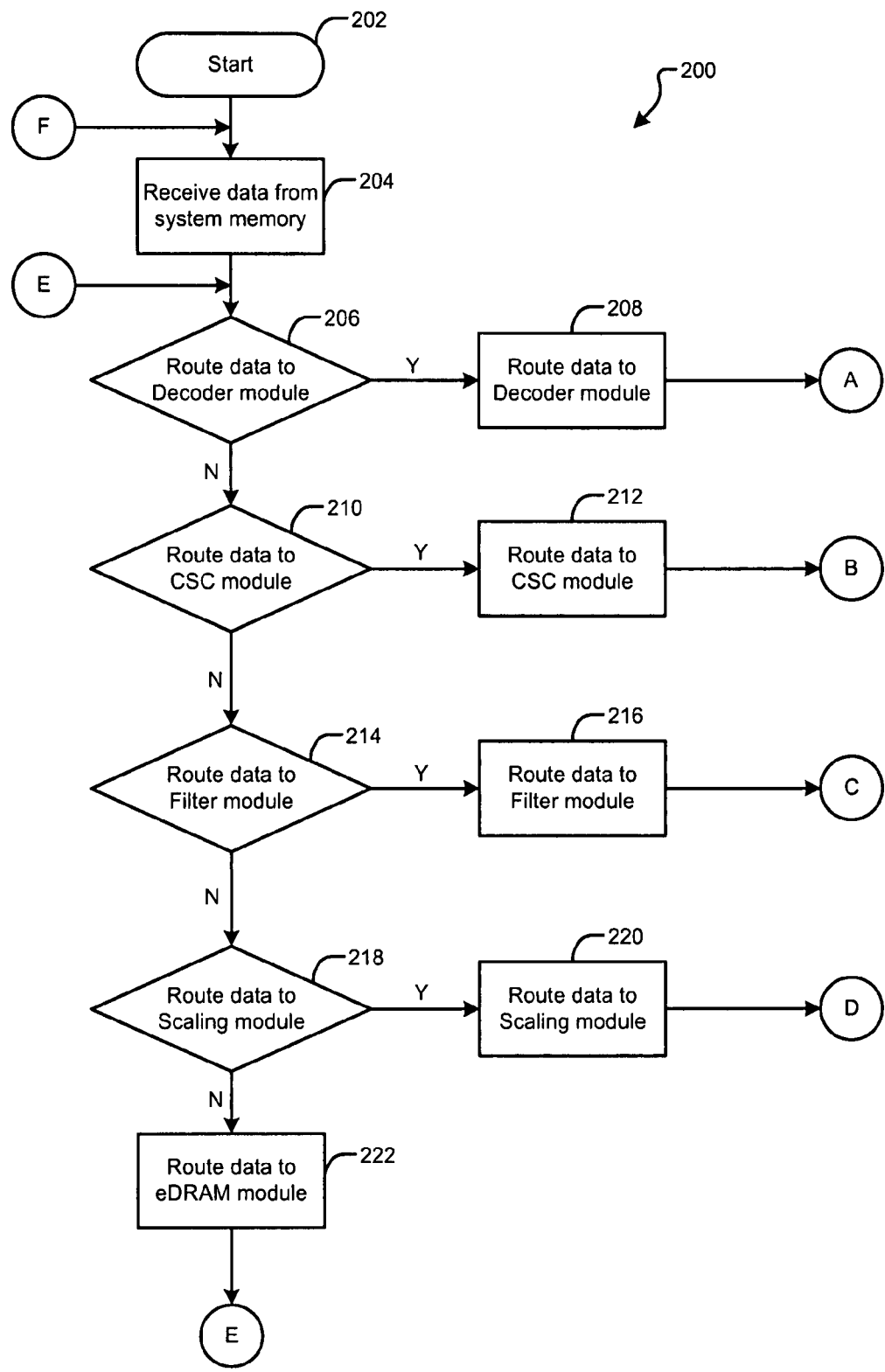
FIGS. 5A-5E are flowcharts of a method for processing data using a pipeline interposer according to the present disclosure.

Referring now to FIGS. 5A-5E, a method 200 for processing data using the interposer module 110 is shown. In FIG. 5A, the method 200 may begin in step 202. The interposer module 110 may receive image data from the system memory 14 in step 204. Based on the control signals generated by the control module 116, the routing module 112 may determine whether to route the image data to the decoder module 122 in step 206. If true, the routing module 112 may route the image data to the decoder module 122 in step 208, and steps "A" are performed.

If, however, the result of step 206 is false, the routing module 112 may determine whether to route the image data to the CSC module 124 in step 210. If true, the routing module 112 may route the image data to the CSC module 124 in step 212, and steps "B" are performed. If, however, the result of step 210 is false, the routing module 112 may determine whether to route the image data to the filter module 126 in step 214. If true, the routing module 112 may route the image data to the filter module 126 in step 216, and steps "C" are performed.

If, however, the result of step 214 is false, the routing module 112 may determine whether to route the image data to the scaling module 128 in step 218. If true, the routing module 112 may route the image data to the scaling module 128 in step 220, and steps "D" are performed. If, however, the result of step 218 is false, the routing module 112 may route the image data to the eDRAM module 130 in step 222, and steps "E" are performed. Additionally, in step 222, the memory management module 114 may dynamically allocate adequate amount of memory in the eDRAM module 130 based on the memory allocation signals generated by the control module 116.

Figure 5B:
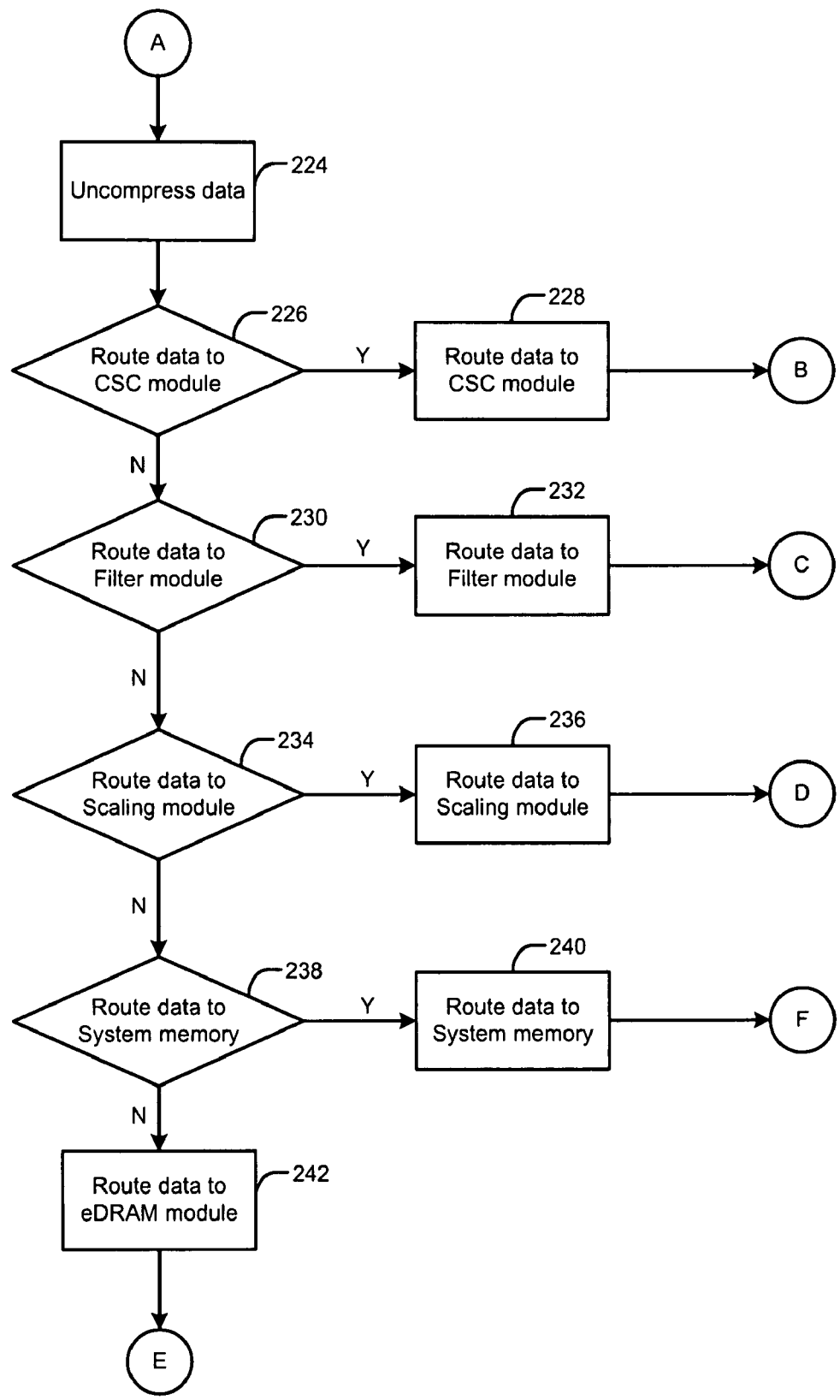

In FIG. 5B, steps "A" are shown. In step 224, the decoder module 122 may uncompress the data routed by the routing module 112, which may include the image data, or color converted, filtered, or scaled data. The routing module 112 may determine whether to route the data to the CSC module 124 in step 226. If true, the routing module 112 may route the data to the CSC module 124 in step 228, and steps "B" are performed. If, however, the result of step 226 is false, the routing module 112 may determine whether to route the data to the filter module 126 in step 230. If true, the routing module 112 may route the data to the filter module 126 in step 232, and steps "C" are performed.

If, however, the result of step 230 is false, the routing module 112 may determine whether to route the data to the scaling module 128 in step 234. If true, the routing module 112 may route the data to the scaling module 128 in step 236, and steps "D" are performed. If, however, the result of step 234 is false, the routing module 112 may determine whether to route the data to the system memory 14 in step 238. If true, the routing module 112 may route the data to the system memory 14 in step 240, and steps "F" are performed. If, however, the result of step 238 is false, the routing module 112 may route the data to the eDRAM module 130 in step 242, and steps "E" are performed. Additionally, in step 242, the memory management module 114 may dynamically allocate adequate amount of memory in the eDRAM module 130 based on the memory allocation signals generated by the control module 116.

Figure 5C:
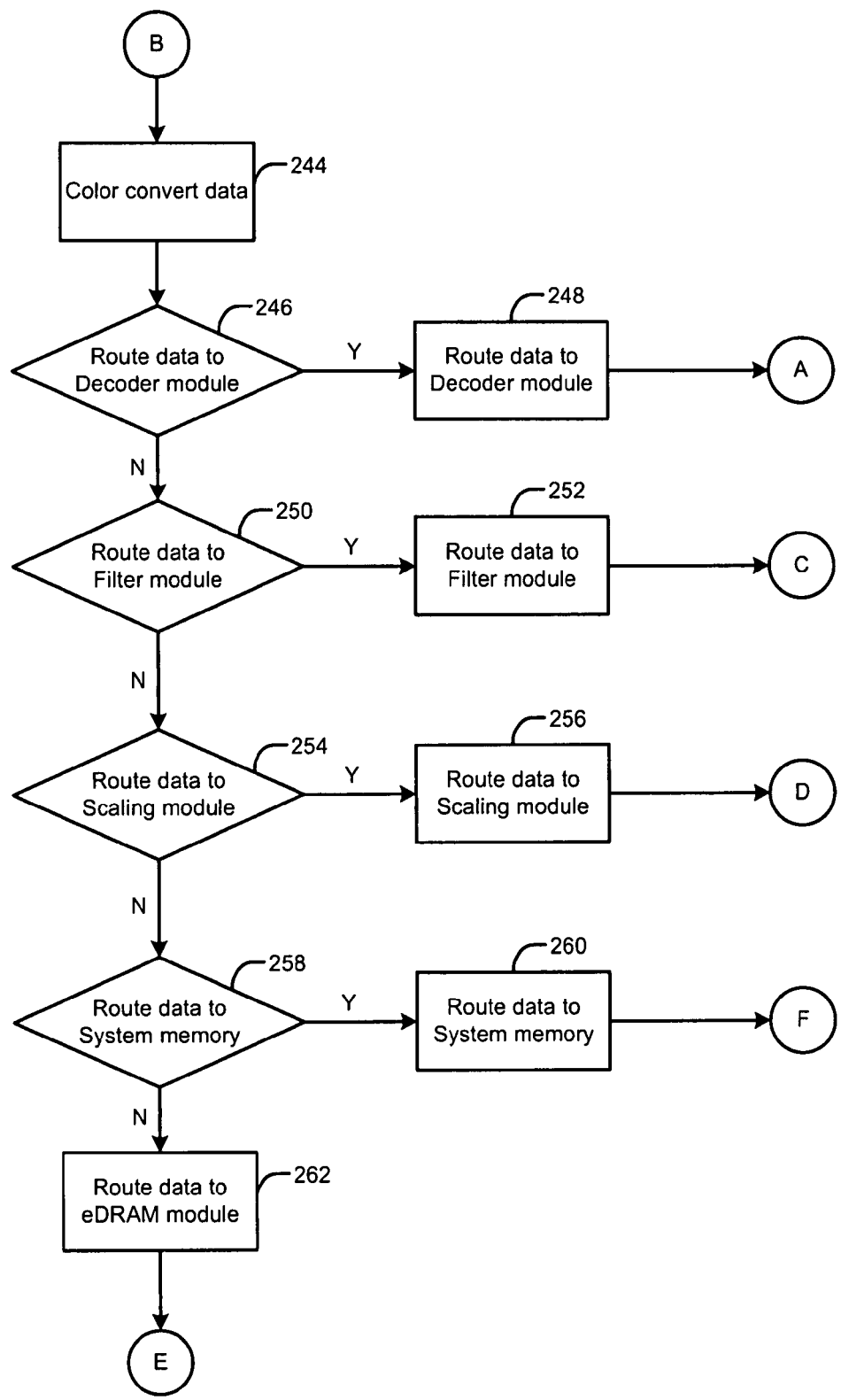

In FIG. 5C, steps "B" are shown. In step 244, the CSC module 124 may color convert the data routed by the routing module 112, which may include the image data, or uncompressed, filtered, or scaled data. The routing module 112 may determine whether to route the data to the decoder module 122 in step 246. If true, the routing module 112 may route the data to the decoder module 122 in step 248, and steps "A" are performed. If, however, the result of step 246 is false, the routing module 112 may determine whether to route the data to the filter module 126 in step 250. If true, the routing module 112 may route the data to the filter module 126 in step 252, and steps "C" are performed.

If, however, the result of step 250 is false, the routing module 112 may determine whether to route the data to the scaling module 128 in step 254. If true, the routing module 112 may route the data to the scaling module 128 in step 256, and steps "D" are performed. If, however, the result of step 254 is false, the routing module 112 may determine whether to route the data to the system memory 14 in step 258. If true, the routing module 112 may route the data to the system memory 14 in step 260, and steps "F" are performed. If, however, the result of step 258 is false, the routing module 112 may route the data to the eDRAM module 130 in step 262, and steps "E" are performed. Additionally, in step 262, the memory management module 114 may dynamically allocate adequate amount of memory in the eDRAM module 130 based on the memory allocation signals generated by the control module 116.

Figure 5D:
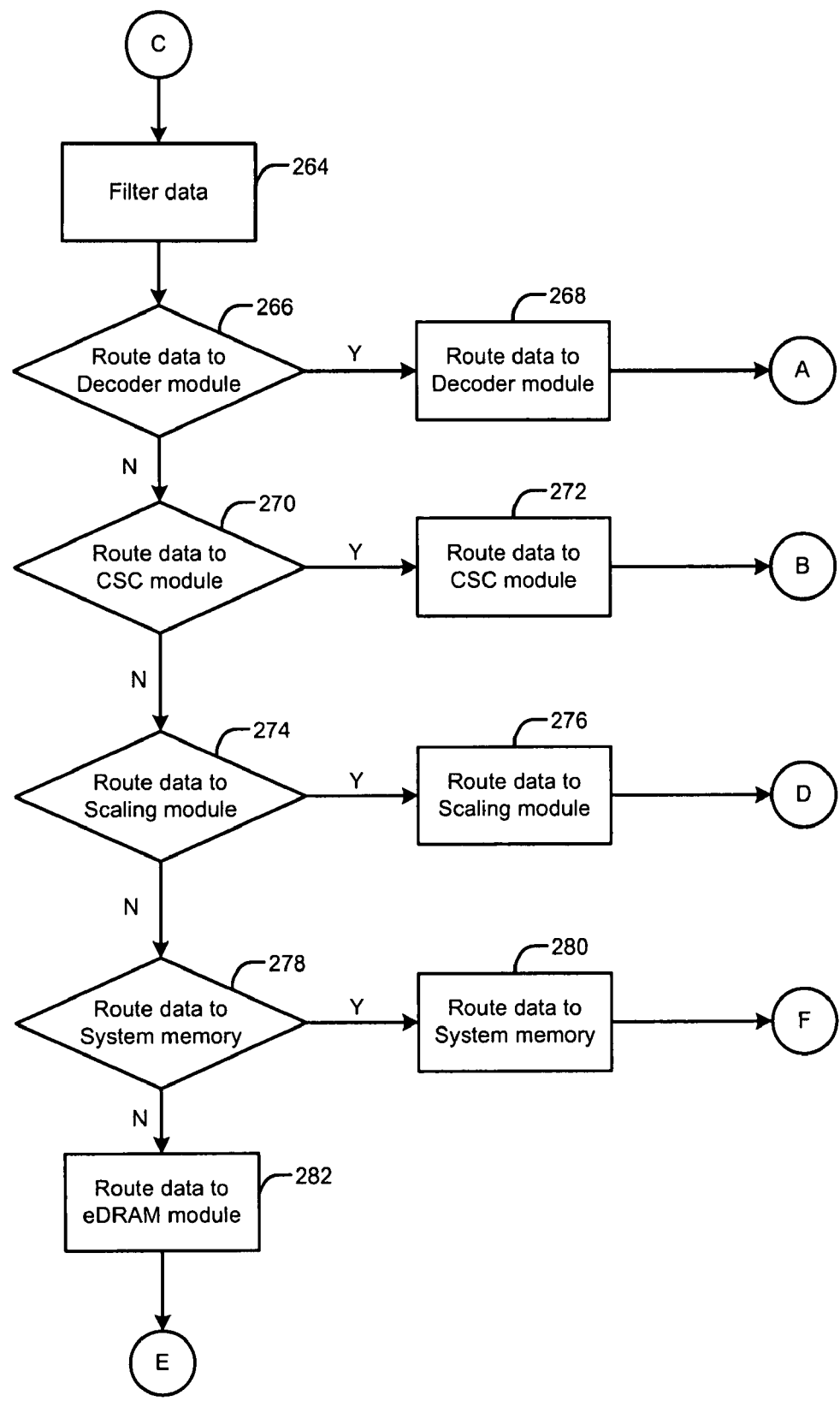

In FIG. 5D, steps "C" are shown. In step 264, the filter module 126 may filter the data routed by the routing module 112, which may include the image data, or uncompressed, color converted, or scaled data. The routing module 112 may determine whether to route the data to the decoder module 122 in step 266. If true, the routing module 112 may route the data to the decoder module 122 in step 268, and steps "A" are performed. If, however, the result of step 266 is false, the routing module 112 may determine whether to route the data to the CSC module 124 in step 270. If true, the routing module 112 may route the data to the CSC module 124 in step 272, and steps "B" are performed.

If, however, the result of step 270 is false, the routing module 112 may determine whether to route the data to the scaling module 128 in step 274. If true, the routing module 112 may route the data to the scaling module 128 in step 276, and steps "D" are performed. If, however, the result of step 274 is false, the routing module 112 may determine whether to route the data to the system memory 14 in step 278. If true, the routing module 112 may route the data to the system memory 14 in step 280, and steps "F" are performed. If, however, the result of step 278 is false, the routing module 112 may route the data to the eDRAM module 130 in step 282, and steps "E" are performed. Additionally, in step 282, the memory management module 114 may dynamically allocate adequate amount of memory in the eDRAM module 130 based on the memory allocation signals generated by the control module 116.

Figure 5E:
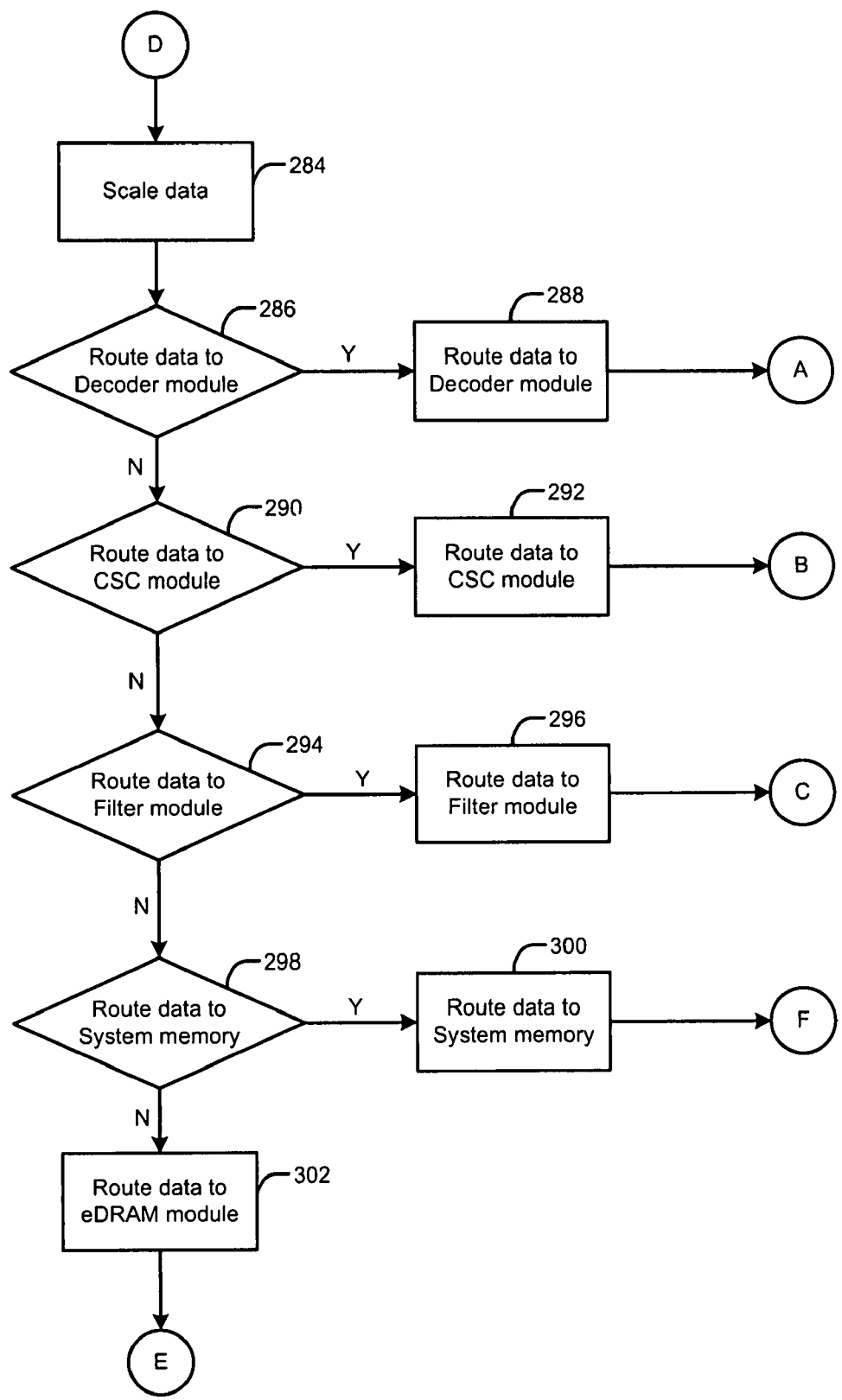

In FIG. 5E, steps "D" are shown. In step 284, the scaling module 128 may scale the data routed by the routing module 112, which may include the image data, or uncompressed, color converted, or filtered data. The routing module 112 may determine whether to route the data to the decoder module 122 in step 286. If true, the routing module 112 may route the data to the decoder module 122 in step 288, and steps "A" are performed. If, however, the result of step 286 is false, the routing module 112 may determine whether to route the data to the CSC module 124 in step 290. If true, the routing module 112 may route the data to the CSC module 124 in step 292, and steps "B" are performed.

If, however, the result of step 290 is false, the routing module 112 may determine whether to route the data to the filter module 126 in step 294. If true, the routing module 112 may route the data to the filter module 126 in step 296, and steps "C" are performed. If, however, the result of step 294 is false, the routing module 112 may determine whether to route the data to the system memory 14 in step 298. If true, the routing module 112 may route the data to the system memory 14 in step 300, and steps "F" are performed. If, however, the result of step 298 is false, the routing module 112 may route the data to the eDRAM module 130 in step 302, and steps "E" are performed. Additionally, in step 302, the memory management module 114 may dynamically allocate adequate amount of memory in the eDRAM module 130 based on the memory allocation signals generated by the control module 116.

Thus, ASICs using the interposer module 110 may offer following benefits. First, the interposer module 110 can flexibly configure the order of processing data (e.g., decoding, color converting, filtering, and scaling) and skip one or more functions. Second, since the amount of memory in the eDRAM module 130 can be flexibly allocated, more or less memory may be allocated for a given function. Thus, CSC, filtering, or scaling may be performed in detail by using additional memory.

Third, since eDRAM cells are smaller in size than static RAM (SRAM) cells used in conventional ASICs, the size of the ASIC 100 may be smaller than conventional ASICs. Alternatively, more eDRAM may be packaged in the ASIC 100 than in conventional ASICs. Fourth, since the interposer module 110 may read/write data from/to the system memory 14 only once, the bandwidth of the system bus 18 is affected less adversely than in conventional ASICs. Fifth, since the interposer bus 111 can be much wider (e.g., 128 bits) than the system bus 18 (e.g., 32 bits) and since eDRAM can easily interface with a wide bus, data transfer rates using the interposer module 110 can be much higher than in conventional ASICs.

Additionally, the ASIC 100 may be utilized for many applications such as manipulating complicated data. For example, transform functions such as converting from small endian to large endian or changing direction of data from left to right or from right to left may be performed. Other applications may include standard FIFO operations that do not use the eDRAM module 130 when only one change in data has to be performed. Standard FIFO operations may allow the processing modules 121 to use additional memory in the eDRAM module 130 when the processing modules 121 need additional memory.

Figure 6B:
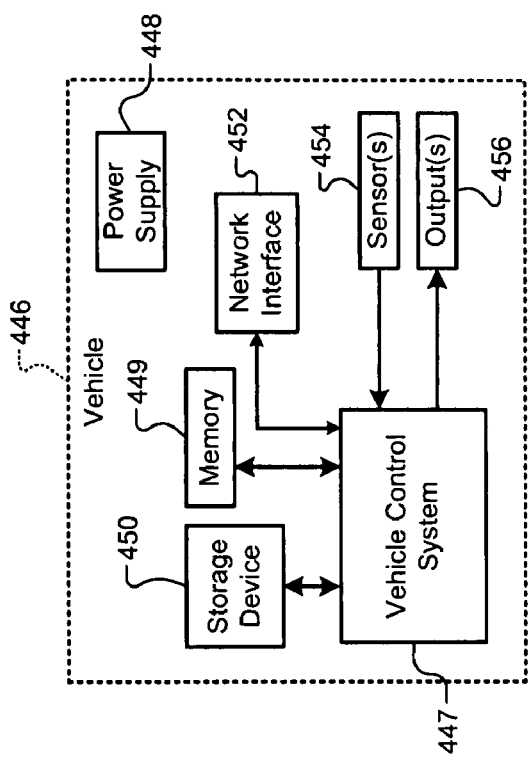
FIG. 6B is a functional block diagram of a vehicle control system.
Figure 6A:
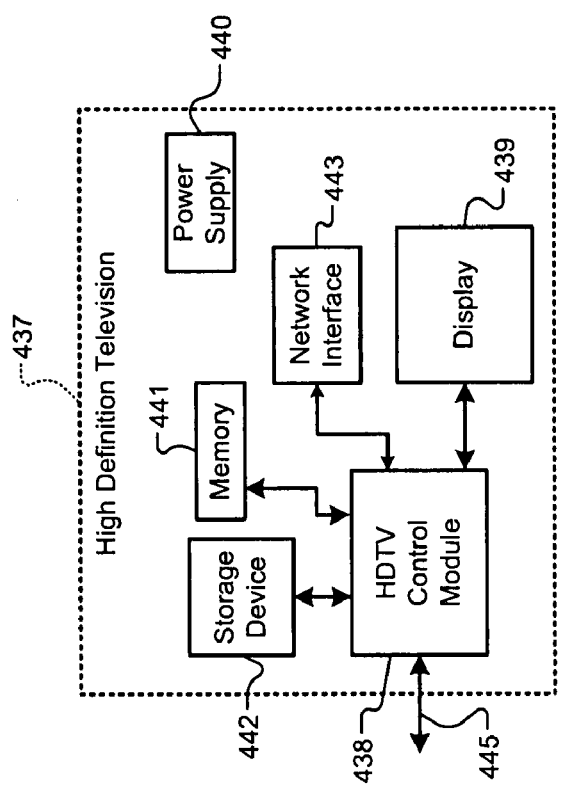
FIG. 6A is a functional block diagram of a high definition television.

Referring now to FIGS. 6A-6E, various exemplary implementations incorporating the teachings of the present disclosure are shown. Referring now to FIG. 6A, the teachings of the disclosure can be implemented in an HDTV control module 438 of a high definition television (HDTV) 437. The HDTV 437 includes the HDTV control module 438, a display 439, a power supply 440, memory 441, a storage device 442, a network interface 443, and an external interface 445. If the network interface 443 includes a wireless local area network interface, an antenna (not shown) may be included.

The HDTV 437 can receive input signals from the network interface 443 and/or the external interface 445, which can send and receive data via cable, broadband Internet, and/or satellite. The HDTV control module 438 may process the input signals, including encoding, decoding, filtering, and/or formatting, and generate output signals. The output signals may be communicated to one or more of the display 439, memory 441, the storage device 442, the network interface 443, and the external interface 445.

Memory 441 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 442 may include an optical storage drive, such as a DVD drive, and/or a hard disk drive (HDD). The HDTV control module 438 communicates externally via the network interface 443 and/or the external interface 445. The power supply 440 provides power to the components of the HDTV 437.

Referring now to FIG. 6B, the teachings of the disclosure may be implemented in a vehicle control system 447 of a vehicle 446. The vehicle 446 may include the vehicle control system 447, a power supply 448, memory 449, a storage device 450, and a network interface 452. If the network interface 452 includes a wireless local area network interface, an antenna (not shown) may be included. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 450 may include an optical storage drive, such as a DVD drive, and/or a hard disk drive (HDD). The vehicle control system 447 may communicate externally using the network interface 452.

Figure 6D:
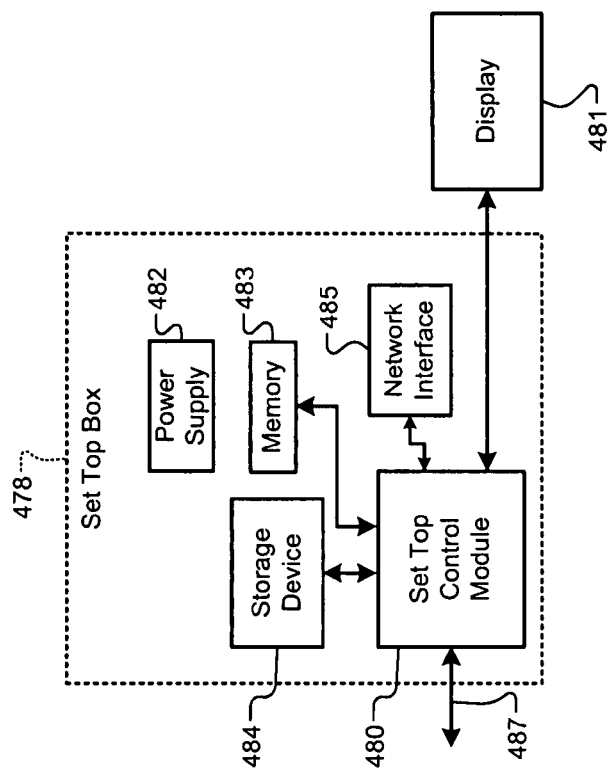
FIG. 6D is a functional block diagram of a set top box.
Figure 6C:
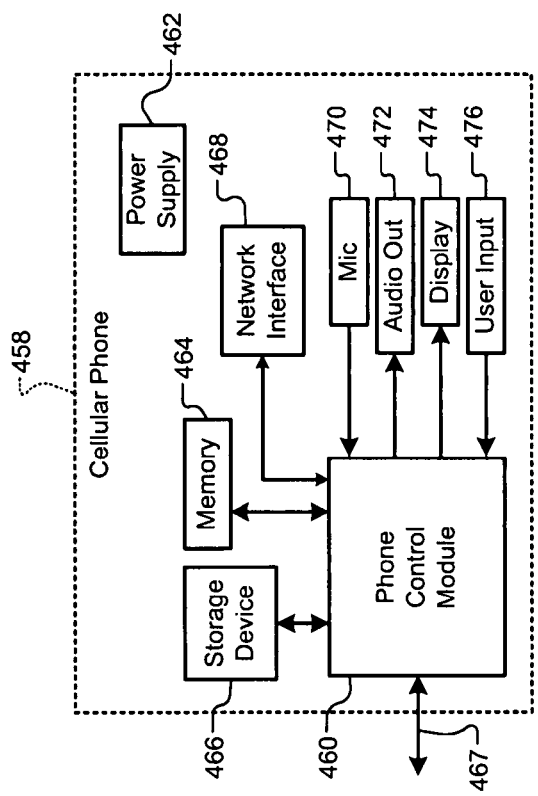
FIG. 6C is a functional block diagram of a cellular phone.

Referring now to FIG. 6C, the teachings of the disclosure can be implemented in a phone control module 460 of a cellular phone 458. The cellular phone 458 includes the phone control module 460, a power supply 462, memory 464, a storage device 466, and a cellular network interface 467. The cellular phone 458 may include a network interface 468, a microphone 470, an audio output 472 such as a speaker and/or output jack, a display 474, and a user input device 476 such as a keypad and/or pointing device. If the network interface 468 includes a wireless local area network interface, an antenna (not shown) may be included.

The phone control module 460 may receive input signals from the cellular network interface 467, the network interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the network interface 468, and the audio output 472.

Memory 464 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 466 may include an optical storage drive, such as a DVD drive, and/or a hard disk drive (HDD). The power supply 462 provides power to the components of the cellular phone 458.

Referring now to FIG. 6D, the teachings of the disclosure can be implemented in a set top control module 480 of a set top box 478. The set top box 478 includes the set top control module 480, a display 481, a power supply 482, memory 483, a storage device 484, and a network interface 485. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor. The output may also be sent to the external interface 487.

The power supply 482 provides power to the components of the set top box 478. Memory 483 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 484 may include an optical storage drive, such as a DVD drive, and/or a hard disk drive (HDD).

Figure 6E:
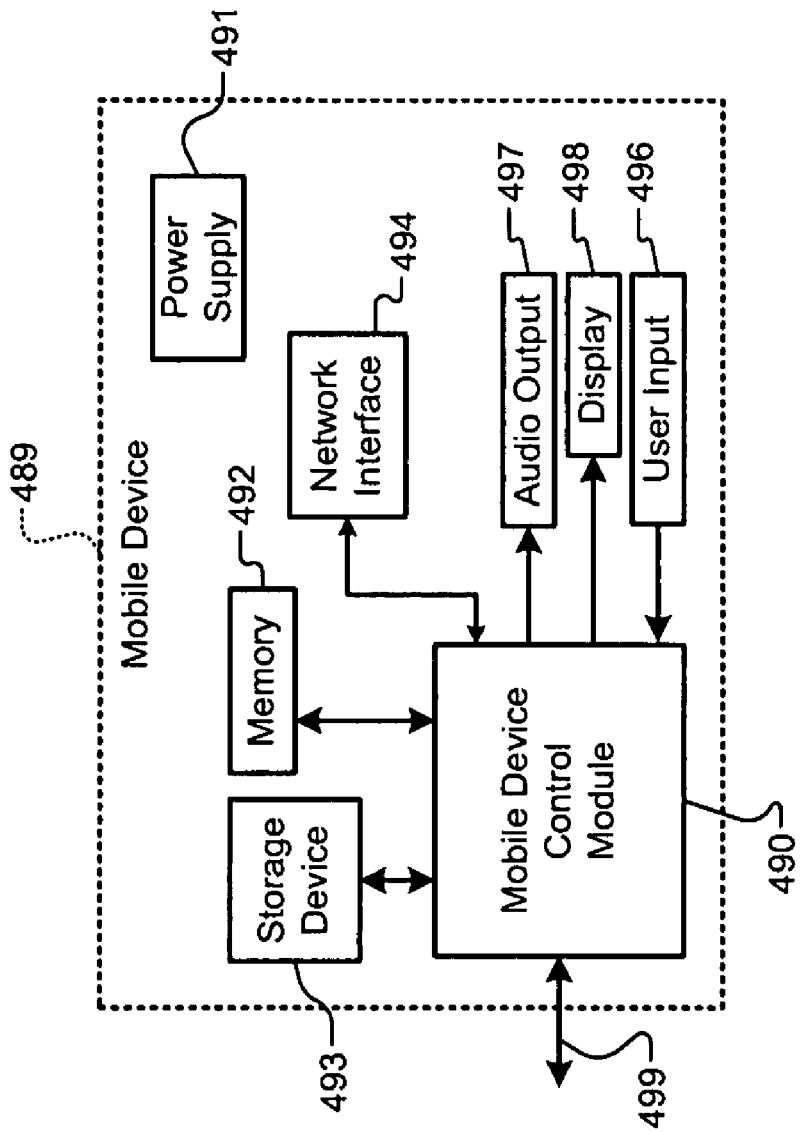
FIG. 6E is a functional block diagram of a mobile device.

Referring now to FIG. 6E, the teachings of the disclosure can be implemented in a mobile device control module 490 of a mobile device 489. The mobile device 489 may include the mobile device control module 490, a power supply 491, memory 492, a storage device 493, a network interface 494, and an external interface 499. If the network interface 494 includes a wireless local area network interface, an antenna (not shown) may be included.

The mobile device control module 490 may receive input signals from the network interface 494 and/or the external interface 499. Audio and video may be output to the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An application specific integrated circuit (ASIC) comprising:
   a first bus that communicates with inputs and outputs of N processing modules, where N is an integer greater than 1;
   a control module that
      communicates with said first bus and a second bus that is different than said first bus, and
      generates first control signals;
   a routing module that
      communicates with said first bus,
      receives data via said second bus from a first memory,
      selectively routes said data to a first of said inputs, and
      selectively routes one of said outputs to a second of said inputs,
      wherein said routing module selects said first and second of said inputs based on said first control signals; and
   a second memory that is different than said first memory, wherein said second memory communicates with said first bus,
   wherein said control module generates second control signals that are different than said first control signals, and
   wherein said routing module selectively routes said data and said one of said outputs to portions of said second memory based on said first control signals, wherein a memory size of said portions is determined based on said second control signals.

2. A system comprising the ASIC of claim 1 and said first memory.

3. The ASIC of claim 1 further comprising a memory management module that communicates with said first bus and that determines said memory size of said portions based on said second control signals.

4. The ASIC of claim 1, wherein said routing module routes information stored in said portions to one of said inputs selected based on said first control signals.

5. The ASIC of claim 1, wherein said routing module routes said one of said outputs to said first memory based on said first control signals.

6. The ASIC of claim 1, wherein said second memory includes an embedded dynamic random access memory (eDRAM).

7. The ASIC of claim 1, wherein said control module generates said first control signals based on information received from a processor in said ASIC.

8. The ASIC of claim 1, wherein said control module generates said second control signals based on processing speeds of said N processing modules.

9. The ASIC of claim 1, wherein said N processing modules comprise a standard pipeline interface.

10. The ASIC of claim 9, wherein said N processing modules communicate with each other in an order determined by said first control signals.

11. The ASIC of claim 10, wherein said order is sequential.

12. The ASIC of claim 3 further comprising:
    said second bus;
    a memory control module that
        communicates with said second bus, and
        controls said first memory;
    an input/output (I/O) module that
        communicates with said second bus,
        receives said data from sources external to said ASIC, and
        stores said data in said first memory;
    and a processor that executes programs, wherein said programs use processed data generated by said N processing modules.

13. An image data processing device comprising the ASIC of claim 1, wherein said N processing modules include a decoder module, a color space converter (CSC) module, a filter module, and a scaling module, and wherein said N processing modules process said data in an order that is determined by said first control signals.

14. The ASIC of claim 1 further comprising said first memory.

15. The ASIC of claim 1, wherein said first memory is external to said ASIC.

16. An application specific integrated circuit (ASIC) comprising:
    a first bus that communicates with inputs and outputs of N processing means for processing, where N is an integer greater than 1;
    control means for
        communicating with said first bus and a second bus that is different than said first bus, and
        generating first control signals;
    routing means for
        communicating with said first bus,
        receiving data via said second bus from a first memory,
        selectively routing said data to a first of said inputs, and
        selectively routing one of said outputs to a second of said inputs,
        wherein said routing means selects said first and second of said inputs based on said first control signals; and a second memory that is different than said first memory, wherein said second memory and communicates with said first bus, wherein said control means generates second control signals that are different than said first control signals, and wherein said routing means selectively routes said data and said one of said outputs to portions of said second memory based on said first control signals, wherein a memory size of said portions is determined based on said second control signals.

17. A system comprising the ASIC of claim 16 and said first memory.

18. The ASIC of claim 16 further comprising memory management means for communicating with said first bus and for determining said memory size of said portions based on said second control signals.

19. The ASIC of claim 16, wherein said routing means routes information stored in said portions to one of said inputs selected based on said first control signals.

20. The ASIC of claim 16, wherein said routing means routes said one of said outputs to said first memory based on said first control signals.

21. The ASIC of claim 16, wherein said second memory includes an embedded dynamic random access memory (eDRAM).

22. The ASIC of claim 16, wherein said control means generates said first control signals based on information received from a processor in said ASIC.

23. The ASIC of claim 16, wherein said control means generates said second control signals based on processing speeds of said processing means.

24. The ASIC of claim 16, wherein said N processing means comprise a standard pipeline interface.

25. The ASIC of claim 24, wherein said N processing means communicate with each other in an order determined by said first control signals.

26. The ASIC of claim 25, wherein said order is sequential.

27. The ASIC of claim 18 further comprising:
said second bus;
memory control means for
communicating with said second bus, and
controlling said first memory;
input/output (I/O) means for
communicating with said second bus,
receiving said data from sources external to said ASIC, and
storing said data in said first memory; and
a processor that executes programs, wherein said programs use processed data generated by said N processing means.

28. An image data processing device comprising the ASIC of claim 16, wherein said N processing means include decoder means for decoding, color space converter (CSC) means for converting, filter means for filtering, and scaling means for scaling, and wherein said processing means processes said data in an order that is determined by said first control signals.

29. The ASIC of claim 16 further comprising said first memory.

30. The ASIC of claim 16, wherein said first memory is external to said ASIC.

31. A method for operating an application specific integrated circuit (ASIC), the method comprising:
providing a first bus that communicates with inputs and outputs of N processing modules, where N is an integer greater than 1;
providing a control module, wherein said control module communicates with said first bus and a second bus that is different than said first bus, and
generates first control signals;
providing a routing module, wherein said routing module communicates with said first bus, that
receives data via said second bus from a first memory,
selectively routes said data to a first of said inputs, and
selectively routes one of said outputs to a second of said inputs;
selecting said first and second of said inputs based on said first control signals using said routing module; and
providing a second memory that is different than said first memory, wherein said second memory communicates with said first bus,
wherein said control module generates second control signals that are different than said first control signals, and
wherein said routing module selectively routes said data and said one of said outputs to portions of said second memory based on said first control signals, wherein a memory size of said portions is determined based on said second control signals.

32. The method of claim 31 further comprising determining said memory size of said portions based on said second control signals.

33. The method of claim 31 further comprising routing information stored in said portions to one of said inputs selected based on said first control signals.

34. The method of claim 31 further comprising routing said one of said outputs to said first memory based on said first control signals.

35. The method of claim 31, wherein said second memory includes an embedded dynamic random access memory (eDRAM).

36. The method of claim 31 further comprising generating said first control signals based on information received from a processor in said ASIC.

37. The method of claim 31 further comprising generating said second control signals based on processing speeds of said N processing modules.

38. The method of claim 31, wherein said N processing modules comprise a standard pipeline interface.

39. The method of claim 38, wherein said N processing modules communicate with each other in an order determined by said first control signals.

40. The method of claim 39, wherein said order is sequential.

* * * * *